(12) United States Patent
Liu et al.

(10) Patent No.: US 10,953,512 B2
(45) Date of Patent: Mar. 23, 2021

(54) DEVICE FOR REMOVING CIRCUMFERENTIAL BURRS OF WHEEL WITH HIGH PRECISION

(71) Applicant: CITIC DICASTAL CO., LTD, Hebei (CN)

(72) Inventors: Huiying Liu, Hebei (CN); Hongsen Zhang, Hebei (CN); Shoujun Fu, Hebei (CN); Yongwang Zhao, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 427 days.

(21) Appl. No.: 16/052,919

(22) Filed: Aug. 2, 2018

(65) Prior Publication Data

US 2019/0224802 A1 Jul. 25, 2019

(30) Foreign Application Priority Data

Jan. 24, 2018 (CN) .......................... 201810066925.4

(51) Int. Cl.
*B24B 9/00* (2006.01)
*B23D 79/04* (2006.01)
(Continued)

(52) U.S. Cl.
CPC ................ *B24B 9/005* (2013.01); *B23B 5/00* (2013.01); *B23D 79/04* (2013.01); *B24B 5/44* (2013.01);
(Continued)

(58) Field of Classification Search
CPC . B23B 2260/128; B23B 2270/12; B23B 5/00; B23B 79/00; B23B 79/04;
(Continued)

(56) References Cited

U.S. PATENT DOCUMENTS

| | | | |
|---|---|---|---|
| 2007/0222133 A1* | 9/2007 | Sammartin | ............ B23Q 3/183 |
| | | | 269/139 |
| 2018/0003592 A1 | 1/2018 | Liu et al. | |
| 2019/0061092 A1 | 2/2019 | Liu et al. | |

FOREIGN PATENT DOCUMENTS

| | | |
|---|---|---|
| CN | 103531509 A | 1/2014 |
| CN | 204461366 U | 7/2015 |

(Continued)

OTHER PUBLICATIONS

European Search Report; The Hague; dated Jun. 28, 2019.

*Primary Examiner* — Monica S Carter
*Assistant Examiner* — Michael A Gump
(74) *Attorney, Agent, or Firm* — IPro, PLLC; Qian Gu

(57) ABSTRACT

A device for removing circumferential burrs of a wheel with high precision includes an electric cylinder, a lifting table, guide rails, an electric cylinder, a sliding block, a plurality of sensors, a rim burr cutter, a riser burr cutter, and the like. The device can simultaneously remove circumferential burrs from the flange edge, the outer rim and the riser slot edge, which eliminates the error caused by coaxial degree deviation, so that the rotating center of the cutters coincides with the circumferential center of the burrs. The device is configured to provide high-precision removal of burrs from the flange edge, and high-precision removal of burrs from the outer rim and the riser.

2 Claims, 3 Drawing Sheets

(51) Int. Cl.
*B23B 5/00* (2006.01)
*B24B 5/44* (2006.01)
*B24B 51/00* (2006.01)
B23Q 17/22 (2006.01)
B23Q 3/18 (2006.01)

(52) U.S. Cl.
CPC .......... B24B 51/00 (2013.01); *B23B 2215/08* (2013.01); *B23B 2220/08* (2013.01); *B23B 2260/128* (2013.01); *B23B 2270/12* (2013.01); *B23Q 3/183* (2013.01); *B23Q 17/2233* (2013.01)

(58) Field of Classification Search
CPC . B23B 2215/08; B23B 2220/08; B24B 9/005; B24B 51/00; B24B 27/0076; B24B 5/44; B23Q 3/183; B23Q 17/2233; B23Q 3/08; B23Q 3/062; B23Q 3/186; B23Q 5/34; B23Q 2703/04; G01C 25/00; G01C 25/005; G01B 21/042; G01B 21/045; G01B 7/023; G01B 7/13; G01B 11/026; G01B 2210/10; G01D 5/2448; G01M 17/013; G01M 1/225; G01M 1/02; G01M 1/045
USPC .................. 451/11, 65, 69; 702/94, 95, 155; 73/865.9, 115.01
See application file for complete search history.

(56) References Cited

FOREIGN PATENT DOCUMENTS

| | | | | |
|---|---|---|---|---|
| CN | 105928476 A | 9/2016 | | |
| CN | 106955939 A | 7/2017 | | |
| CN | 107283000 A | 10/2017 | | |
| CN | 107336022 A | * 11/2017 | ......... | B24B 27/0076 |
| CN | 107356192 A | * 11/2017 | ........... | G01B 5/0004 |
| CN | 107414193 A | 12/2017 | | |
| CN | 207952807 U | 10/2018 | | |
| EP | 3437769 | 2/2019 | | |

* cited by examiner

DEVICE FOR REMOVING CIRCUMFERENTIAL BURRS OF WHEEL WITH HIGH PRECISION

CROSS REFERENCE TO RELATED APPLICATION

This application claims priority to Chinese Patent Application No. 2018100669254, entitled DEVICE FOR REMOVING CIRCUMFERENTIAL BURRS OF WHEEL WITH HIGH PRECISION and filed on Jan. 24, 2018, which is incorporated herein by reference in its entirety and for all purposes.

FIELD OF THE INVENTION

The present invention relates to the technical field of removal of burrs from wheels.

BACKGROUND OF THE INVENTION

At present, the turning process of a wheel mainly comprises a first turning and a second turning. The inner wheel flange, inner rim, back-cavity in spoke and center hole of flange of the wheel are machined by the first turning, wherein a ring of burrs is produced at the junction of the back-cavity of the spoke and the flange face. The outer wheel flange and the riser of the wheel are machined by the second turning, wherein a ring of burrs remains at the edge of the outer wheel flange, and a ring of burrs also remains at the edge of the riser. Since the above three kinds of burrs are circumferential burrs, it is difficult to ensure the roundness of pieces by manual removal. The poor roundness leads to not only an unqualified appearance, but also uneven coverage of a paint film which would be prone to corrosion. Therefore, the circumferential burrs need to be removed by automatic equipment. Since the first turning and the second turning are completed on two lathes, there is coaxial deviation between them, that is, the burrs at the flange face produced in the first turning may not be coaxial with the burrs at the wheel flange and the riser produced in the second turning. In order to realize high-precision removal of burrs, as it is impossible to enable the burrs produced in the first and second turning to be machined by coaxial cutters, it is needed to eliminate the error caused by the coaxial deviation, that is, to enable the coincidence of the rotating center of the cutters with the circumferential center of the burrs.

SUMMARY OF THE INVENTION

The aim of the present invention is to provide a device for removing a ring of burrs from the flange edge, the outer rim and the riser slot edge of a wheel with high precision, and the device can be used for automatic continuous production.

In order to fulfill the above aim, the technical solution of the present invention is: a device for removing circumferential burrs of a wheel with high precision comprises a frame, lower cylinders, lower guide posts, a lower feeding platform, a servo motor I, a shaft, a rotating disk I, adjusting guide rails, a gear rack A, an adjusting cylinder, a left sliding table, a right sliding table, flange burr cutters, a support plate, clamping guide rails, a left sliding plate, a right sliding plate, a gear rack B, a clamping cylinder, clamping wheels, electric cylinders, a lifting table A, guide rails, an electric cylinder A, guide rails A, a sliding block A, a sensor A, a lifting table B, an electric cylinder B, guide rails B, a sliding block B, a sensor B, a lifting table C, an electric cylinder C, guide rails C, a sliding block C, a sensor C, an upper cylinder, upper guide posts, an upper feeding platform, a longitudinal fixed plate, a longitudinal servo motor, a movable plate A, a transverse servo motor, a movable plate B, a servo motor II, a rotating disk II, a left cylinder, a left guide rail, a left sliding block, a rim burr cutter, a right sliding block, a right guide rail, a right cylinder and a riser burr cutter.

The clamping guide rails are symmetrically installed on the support plate, the left sliding plate and the right sliding plate are symmetrically installed on the clamping guide rails and connected by the gear rack B, the four clamping wheels are symmetrically fixed on the left sliding plate and the right sliding plate, and the output end of the clamping cylinder is connected with the left sliding plate. When the clamping cylinder drives the left sliding plate to move, the right sliding plate moves synchronously under the action of the gear rack B, and the four clamping wheels can position and clamp the inner rim of a wheel.

The four lower cylinders are fixed at the bottom of the frame, the output ends of the lower cylinders are connected with the lower feeding platform to control the up-and-down movement of the lower feeding platform under the guidance of the lower guide posts, the servo motor I is fixedly installed on the lower feeding platform, the output end of the motor is connected with the rotating disk I to control the rotation of the rotating disk I, the two adjusting guide rails are fixed on the rotating disk I, the left sliding table and the right sliding table are installed on the adjusting guide rails and connected by the gear rack A, the two flange burr cutters are symmetrically installed on the left sliding table and the right sliding table, and the distance between the left and right flange burr cutters can be adjusted through the adjusting cylinder to match the diameter of a flange. After the wheel is positioned and clamped on a roller bed, the lower cylinders drive the flange burr cutters to move up to the burrs, and the servo motor I is started to drive the flange burr cutters to rotate so as to remove the flange burrs. The burrs at the inner rim and the flange edge of the wheel are formed by first turning, so the coaxiality is consistent. By positioning and clamping the inner rim, the rotating center of the flange burr cutters is coaxial with the center of the inner rim of the wheel, and the coaxiality of the cutters and the burrs is realized, so that the burrs are removed from the flange edge with high precision.

One electric cylinder is fixedly installed at the lower right of the frame, the output end of the electric cylinder is connected with the lifting platform A, and the electric cylinder controls the up-and-down movement of the lifting platform A under the guidance of the guide rails; and two identical electric cylinders are fixedly installed at the lower left of the frame and control the up-and-down movements of the lifting table B and the lifting table C, respectively. The electric cylinder A is fixed on the lifting table A and its output end is connected with the sliding block A. The electric cylinder A controls the horizontal movement of the sliding block A under the guidance of the guide rails A. The sensor A is installed on the sliding block A and can acquire the point on the outside bead seat when the electric cylinder A drives the sensor A to contact the outside bead seat of the wheel. The electric cylinder B is fixed on the lifting platform B and its output end is connected with the sliding block B. The electric cylinder B controls the horizontal movement of the sliding block B under the guidance of the guide rails B, the sensor B is installed on the sliding block B and can acquire the point on the outside bead seat when the electric cylinder B drives the sensor B to contact the outside bead seat of the wheel. The electric cylinder C is fixed on the lifting table C and its output end is connected with the sliding block C. The electric cylinder C controls the horizontal movement of the sliding block C under the guidance of the guide rails C. The sensor C is installed on the sliding block C and can acquire the point on the outside bead seat when the electric cylinder C drives the sensor C to contact the outside bead seat of the wheel. The included angle between the sliding block B and the sliding block C is preferably 15 to 20 degrees. After the wheel is positioned and clamped on the roller bed, the flange burr cutters begin to remove burrs from the flange edge, at the same time, the electric cylinder A, the electric cylinder B and the electric cylinder C are simultaneously started to drive the sensor A, the sensor B and the sensor C respectively to contact the outside bead seat of the wheel to acquire the positions of the three contact points, a computer connects the three points into a line, and the center coordinates of the outside bead seat of the wheel are found according to the intersection point of perpendicular bisectors; since the outside bead seat, the outer rim and the riser of the wheel are turned in the second step, the coaxiality thereamong is consistent; and when the center of the outside bead seat is found, the centers of burrs at the outer rim and the riser are found. By step nesting, the first step of removing burrs with high precision and the second step of measuring the centers of burrs are performed at the same time, thereby greatly improving the working efficiency of the device.

The upper cylinder is fixed at the top of the frame, and the upper cylinder controls the up-and-down movement of the upper feeding platform under the guidance of the upper guide posts. The longitudinal fixed plate is installed on the upper feeding platform, the longitudinal servo motor is fixed on the longitudinal fixed plate, and the output end of the longitudinal servo motor is connected with a ball screw to control the longitudinal movement of the movable plate A so as to form a longitudinal moving unit; the transverse servo motor is fixed on the movable plate A, and the output end of the transverse servo motor is connected with a ball screw to control the transverse movement of the movable plate B so as to form a transverse moving unit. The servo motor II is installed on the movable plate B, and its output end is connected with the rotating disk II to control the rotation of the rotating disk II. The left cylinder is fixed on the rotating disk II to control the horizontal movement of the left sliding block under the guidance of the left guide rail, the rim burr cutter is installed on the left sliding block, and the position of the rim burr cutter can be adjusted via the left cylinder to match the position of burrs. The right cylinder is fixed on the rotating disk II to control the horizontal movement of the right sliding block under the guidance of the right guide rail, the riser burr cutter is installed on the right sliding block, and the position of the riser burr cutter can be adjusted via the right cylinder to match the position of burrs. In the initial state, the rotating centers of the rim burr cutter and the riser burr cutter coincide with the rotating center of the flange burr cutters, and this center is used as a coordinate origin; after the sensors acquire the three points of the outside bead seat and the center coordinates of the second-step burrs are calculated, and the longitudinal servo motor and the transverse servo motor are started according to the difference between the center coordinates of the second-step burrs and the coordinate origin to adjust the rotating centers of the rim burr cutter and the riser burr cutter, so that the rotating centers of the rim burr cutter and the riser burr cutter coincide with the rotating center of the second-step burrs. Then, the upper cylinder drives the rim burr cutter and the riser burr cutter to move down to the burrs, and the servo motor II drives the burr cutters to rotate, so that the burrs can be removed from the outer rim and the riser with high precision.

The vertical positions of the three sensors can be adjusted through the three electric cylinders, so that the sensors can acquire bead seat points of wheels having different widths; the distance between the two flange burr cutters can be adjusted via the adjusting cylinder, so that they can be used for removing burrs from the wheels having different flange diameters; the rotating radii of the rim burr cutter and the riser burr cutter can be adjusted via the left cylinder and the right cylinder, so that they can be used for removing burrs from the wheels having different outer diameters or different riser diameters. Therefore, this device has a very strong universality.

The working process of the device for removing circumferential burrs of a wheel with high precision is as follows: the clamping cylinder drives the left sliding plate to move, the right sliding plate moves synchronously under the action of the gear rack B, and the four clamping wheels can position and clamp the inner rim of a wheel; after the wheel is positioned and clamped on a roller bed, the lower cylinders drive the flange burr cutters to move up to burrs, and the servo motor I is started to drive the flange burr cutters to rotate so as to remove the burrs from the flange edge with high precision; when the flange burrs are removed, the electric cylinder A, the electric cylinder B and the electric cylinder C are simultaneously started to drive the sensor A, the sensor B and the sensor C to contact the outside bead seat of the wheel to acquire the positions of the three contact points, the computer connects the three points into a line, center coordinates of the outside bead seat of the wheel are found according to the intersection point of perpendicular bisectors, and thus the center of the outside bead seat is found, that is, the centers of burrs at the outer rim and the riser are found; next, the longitudinal servo motor and the transverse servo motor are started according to the difference between the center coordinates of the second-step burrs and the coordinate origin to adjust the rotating centers of the rim burr cutter and the riser burr cutter to coincide with the rotating center of the second-step burrs; and finally, the upper cylinder drives the rim burr cutter and the riser burr cutter to move down to the burrs, and the servo motor II drives the burr cutters to rotate, so that the burrs can be removed from the outer rim and the riser with high precision.

The device can simultaneously remove circumferential burrs from the flange edge, the outer rim and the riser slot edge, which eliminates the error caused by coaxial degree deviation, so that the rotating center of cutters coincide with the circumferential center of the burrs. The device not only realizes high-precision removal of burrs from the flange edge, but also realizes high-precision removal of burrs from the outer rim and the riser.

Figure 1:
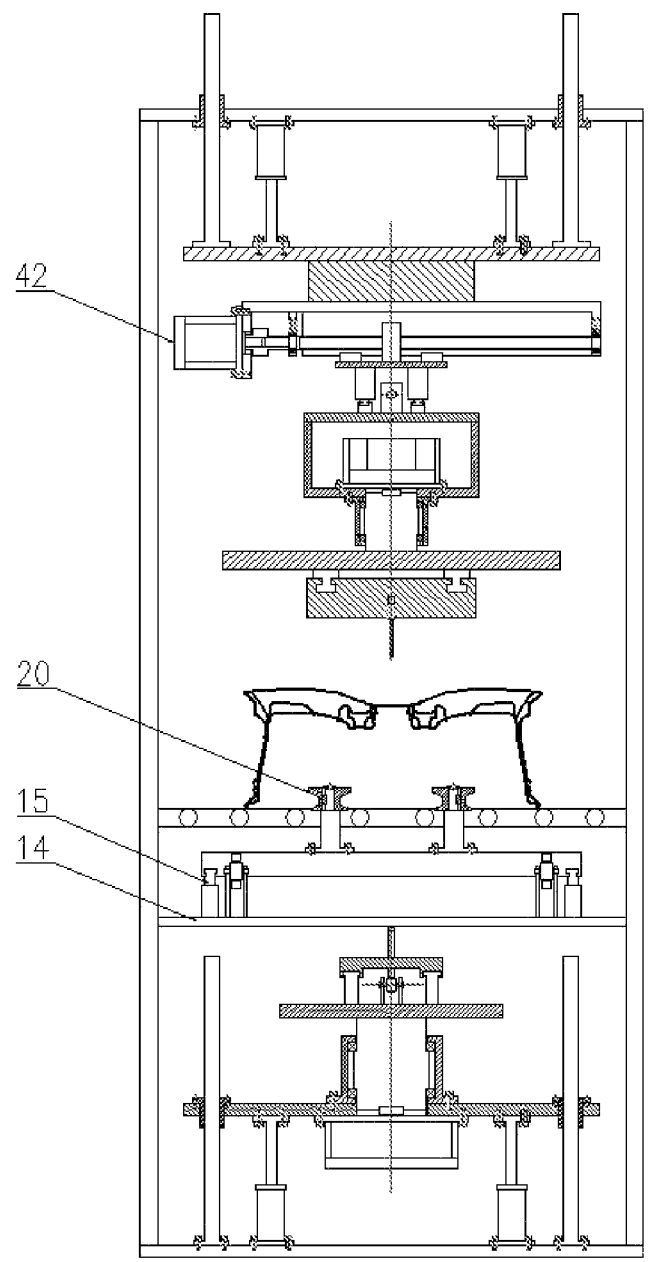
FIG. 1 is a cross-sectional front elevation view of a device for removing circumferential burrs of a wheel with high precision according to the present invention.
Figure 2:
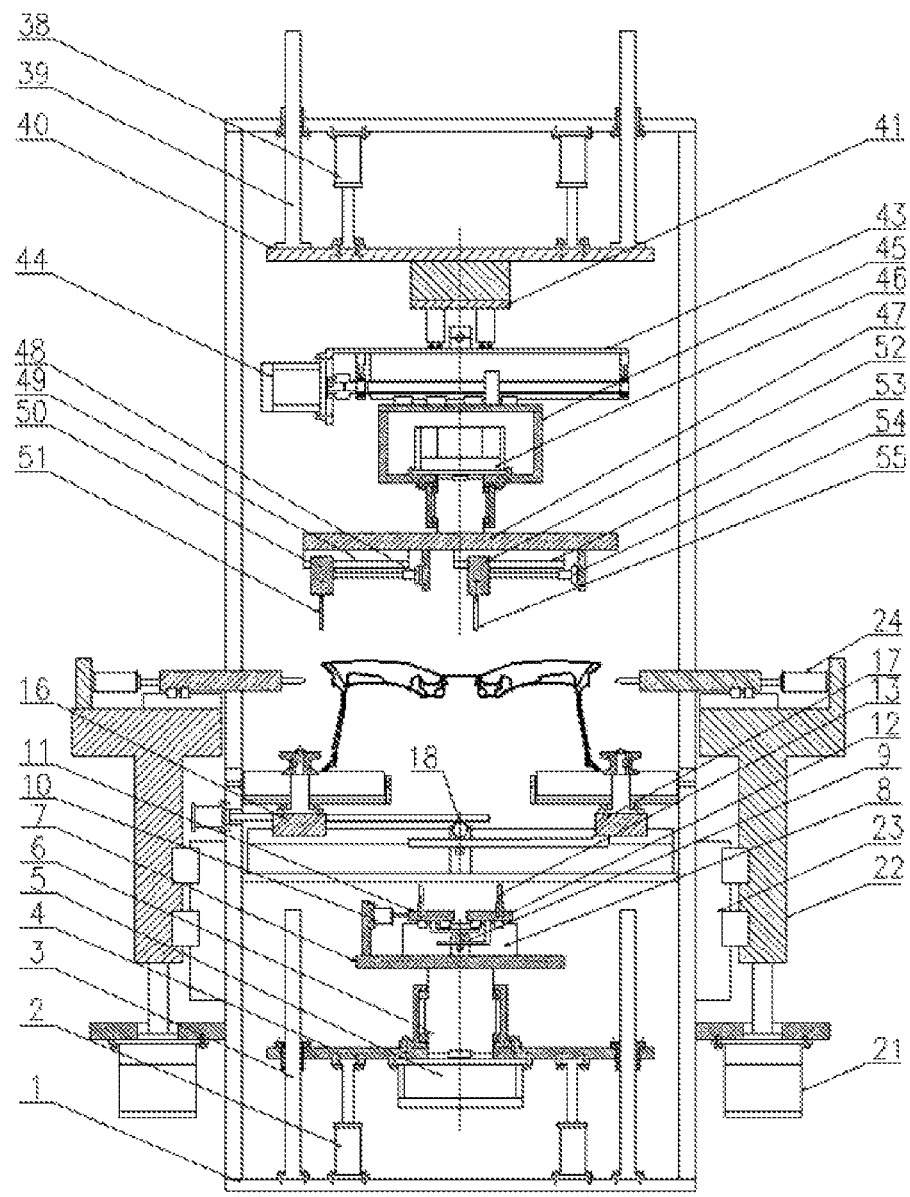
FIG. 2 is a cross-sectional side elevation view of the device for removing circumferential burrs of a wheel with high precision according to the present invention.
Figure 3:
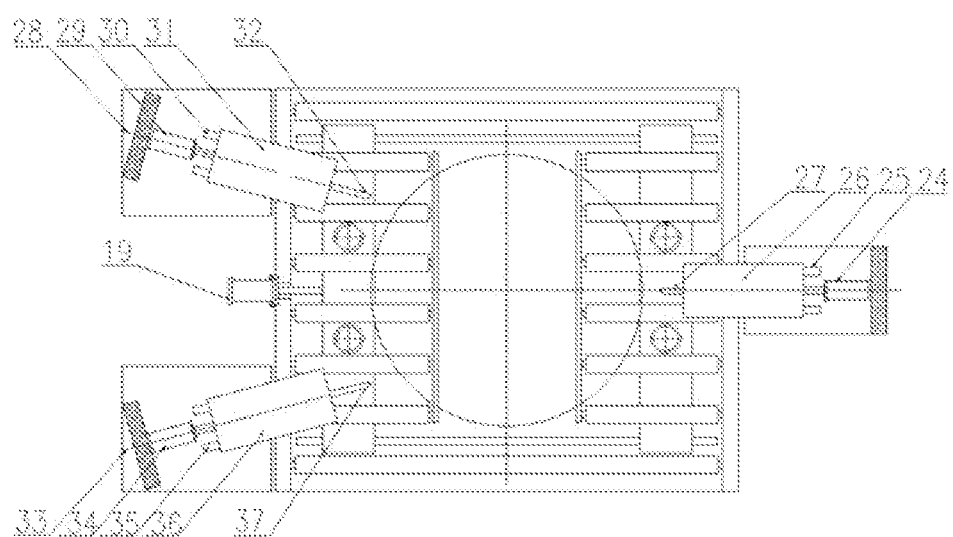
FIG. 3 is a top plan view of the device for removing circumferential burrs of a wheel with high precision according to the present invention.

In the drawings, 1—frame, 2—lower cylinder, 3—lower guide post, 4—lower feeding platform, 5—servo motor I, 6—shaft, 7—rotating disk I, 8—adjusting guide rail, 9—gear rack A, 10—adjusting cylinder, 11—left sliding table, 12—right sliding table, 13—flange burr cutter, 14—support plate, 15—clamping guide rail, 16—left sliding plate, 17—right sliding plate, 18—gear rack B, 19—clamping cylinder, 20—clamping wheel, 21—electric cylinder, 22—lifting table A, 23—guide rail, 24—electric cylinder A, 25—guide rail A, 26—sliding block A, 27—sensor A, 28—lifting table B, 29—electric cylinder B, 30—guide rail B, 31—sliding block B, 32—sensor B, 33—lifting table C, 34—electric cylinder C, 35—guide rail C, 36—sliding block C, 37—sensor C, 38—upper cylinder, 39—upper guide post, 40—upper feeding platform, 41—longitudinal fixed plate, 42—longitudinal servo motor, 43—movable plate A, 44—transverse servo motor, 45—movable plate B, 46—servo motor II, 47—rotating disk II, 48—left cylinder, 49—left guide rail, 50—left sliding block, 51—rim burr cutter, 52—right sliding block, 53—right guide rail, 54—right cylinder, 55—riser burr cutter.

DETAILED DESCRIPTION OF THE EMBODIMENTS

The details and working conditions of the specific device according to the present invention will be described below in combination with the drawings.

A device for removing circumferential burrs of a wheel with high precision comprises a frame 1, lower cylinders 2, lower guide posts 3, a lower feeding platform 4, a servo motor I 5, a shaft 6, a rotating disk I 7, adjusting guide rails 8, a gear rack A 9, an adjusting cylinder 10, a left sliding table 11, a right sliding table 12, flange burr cutters 13, a support plate 14, clamping guide rails 15, a left sliding plate 16, a right sliding plate 17, a gear rack B 18, a clamping cylinder 19, clamping wheels 20, electric cylinders 21, a lifting table A 22, guide rails 23, an electric cylinder A 24, guide rails A 25, a sliding block A 26, a sensor A 27, a lifting table B 28, an electric cylinder B 29, guide rails B 30, a sliding block B 31, a sensor B 32, a lifting table C 33, an electric cylinder C 34, guide rails C 35, a sliding block C 36, a sensor C 37, an upper cylinder 38, an upper guide post 39, an upper feeding platform 40, a longitudinal fixed plate 41, a longitudinal servo motor 42, a movable plate A 43, a transverse servo motor 44, a movable plate B 45, a servo motor II 46, a rotating disk II 47, a left cylinder 48, a left guide rail 49, a left sliding block 50, a rim burr cutter 51, a right sliding block 52, a right guide rail 53, a right cylinder 54 and a riser burr cutter 55.

The clamping guide rails 15 are symmetrically installed on the support plate 14, and the left sliding plate 16 and the right sliding plate 17 are symmetrically installed on the clamping guide rails 15 and connected by the gear rack B 18. The four clamping wheels 20 are symmetrically fixed on the left sliding plate 16 and the right sliding plate 17, and the output end of the clamping cylinder 19 is connected with the left sliding plate 16. When the clamping cylinder 19 drives the left sliding plate 16 to move, the right sliding plate 17 moves synchronously under the action of the gear rack B 18, and the four clamping wheels 20 can position and clamp the inner rim of a wheel.

The four lower cylinders 2 are fixed at the bottom of the frame 1, the output ends of the lower cylinders 2 are connected with the lower feeding platform 4 to control the up-and-down movement of the lower feeding platform 4 under the guidance of the lower guide posts 3, the servo motor I 5 is fixedly installed on the lower feeding platform 4, the output end of the motor is connected with the rotating disk I 7 to control the rotation of the rotating disk I 7, the two adjusting guide rails 8 are fixed on the rotating disk I 7, the left sliding table 11 and the right sliding table 12 are installed on the adjusting guide rails 8 and connected by the gear rack A 9, the two flange burr cutters 13 are symmetrically installed on the left sliding table 11 and the right sliding table 12, and the distance between the left and right flange burr cutters 13 can be adjusted through the adjusting cylinder 10 to match the diameter of a flange. After the wheel is positioned and clamped on a roller bed, the lower cylinders 2 drive the flange burr cutters 13 to move up to the burrs, and the servo motor I 5 is started to drive the flange burr cutters 13 to rotate so as to remove the flange burrs. The burrs at the inner rim and the flange edge of the wheel are formed by the first turning, so the coaxiality is consistent. By positioning and clamping the inner rim, the rotating center of the flange burr cutters 13 is coaxial with the center of the inner rim of the wheel, and the coaxiality of the cutters and the burrs is realized, so that the burrs are removed from the flange edge with high precision.

One electric cylinder 21 is fixedly installed at the lower right part of the frame 1, the output end of the electric cylinder 21 is connected with the lifting table A 22, and the electric cylinder 21 controls the up-and-down movement of the lifting table A 22 under the guidance of the guide rails 23; and two identical electric cylinders are fixedly installed at the lower left part of the frame 1 and control the up-and-down movements of the lifting table B 28 and the lifting table C 33 respectively. The electric cylinder A 24 is fixed on the lifting table A 22 and its output end is connected with the sliding block A 26, the electric cylinder A 24 controls the horizontal movement of the sliding block A 26 under the guidance of the guide rails A 25, the sensor A 27 is installed on the sliding block A 26, and when the electric cylinder A 24 drives the sensor A 27 to contact the outside bead seat of the wheel, the sensor A 27 can acquire a point on the outside bead seat. The electric cylinder B 29 is fixed on the lifting table B 28 and its output end is connected with the sliding block B 31, the electric cylinder B 29 controls the horizontal movement of the sliding block B 31 under the guidance of the guide rails B 30, the sensor B 32 is installed on the sliding block B 31, and when the electric cylinder B 29 drives the sensor B 32 to contact the outside bead seat of the wheel, the sensor B 32 can acquire a point on the outside bead seat. The electric cylinder C 34 is fixed on the lifting table C 33 and its output end is connected with the sliding block C 36, the electric cylinder C 34 controls the horizontal movement of the sliding block C 36 under the guidance of the guide rails C 35, the sensor C 37 is installed on the sliding block C 36, and when the electric cylinder C 34 drives the sensor C 37 to contact the outside bead seat of the wheel, the sensor C 37 can acquire a point on the outside bead seat. The included angle between the sliding block B 31 and the sliding block C 36 is preferably 15 to 20 degrees. After the wheel is positioned and clamped on the roller bed, the flange burr cutters 13 begin to remove burrs from the flange edge, at the same time, the electric cylinder A 24, the electric cylinder B 29 and the electric cylinder C 34 are simultaneously started to drive the sensor A 27, the sensor B 32 and the sensor C 37 respectively to contact the outside bead seat of the wheel to acquire the positions of the three contact points, a computer connects the three points into a line, and the center coordinates of the outside bead seat of the wheel are found according to the intersection point of perpendicular bisectors. Since the outside bead seat, the outer rim and the riser of the wheel are turned in the second step, the coaxiality among them is consistent; and when the center of the outside bead seat is found the centers of burrs at the outer rim and the riser are found. By step nesting, the first step of removing burrs with high precision and the second step of measuring the centers of burrs are performed at the same time, thereby greatly improving the working efficiency of the device.

The upper cylinder 38 is fixed at the top of the frame 1, and the upper cylinder 38 controls the up-and-down movement of the upper feeding platform 40 under the guidance of the upper guide posts 39. The longitudinal fixed plate 41 is installed on the upper feeding platform 40, the longitudinal servo motor 42 is fixed on the longitudinal fixed plate 41, and the output end of the longitudinal servo motor 42 is connected with a ball screw to control the longitudinal movement of the movable plate A 43 so as to form a longitudinal moving unit; the transverse servo motor 44 is fixed on the movable plate A 43, and the output end of the transverse servo motor 44 is connected with a ball screw to control the transverse movement of the movable plate B 45 so as to form a transverse moving unit. The servo motor II 46 is installed on the movable plate B 45, and its output end is connected with the rotating disk II 47 to control the rotation of the rotating disk II 47. The left cylinder 48 is fixed on the rotating disk II 47 to control the horizontal movement of the left sliding block 50 under the guidance of the left guide rail 49, the rim burr cutter 51 is installed on the left sliding block 50, and the position of the rim burr cutter 51 can be adjusted via the left cylinder 48 to match the position of burrs. The right cylinder 54 is fixed on the rotating disk II 47 to control the horizontal movement of the right sliding block 52 under the guidance of the right guide rail 53, the riser burr cutter 55 is installed on the right sliding block 52, and the position of the riser burr cutter 55 can be adjusted via the right cylinder 54 to match the position of burrs. In the initial state, the rotating centers of the rim burr cutter 51 and the riser burr cutter 55 coincide with the rotating center of the flange burr cutters 13, and this center is used as a coordinate origin; after the sensors acquire the three points of the outside bead seat and the center coordinates of the second-step burrs are calculated, and the longitudinal servo motor 42 and the transverse servo motor 44 are started according to the difference between the center coordinates of the second-step burrs and the coordinate origin to adjust the rotating centers of the rim burr cutter 51 and the riser burr cutter 55, so that the rotating centers of the rim burr cutter 51 and the riser burr cutter 55 coincide with the rotating center of the second-step burrs. Then, the upper cylinder 38 drives the rim burr cutter 51 and the riser burr cutter 55 to move down to the burrs, and the servo motor II 46 drives the burr cutters to rotate, so that the burrs can be removed from the outer rim and the riser with high precision.

The vertical positions of the three sensors can be adjusted through the three electric cylinders, so that the sensors can acquire bead seat points of wheels having different widths; the distance between the two flange burr cutters 13 can be adjusted via the adjusting cylinder 10, so that they can be used for removing burrs from the wheels having different flange diameters; the rotating radii of the rim burr cutter 51 and the riser burr cutter 55 can be adjusted via the left cylinder 48 and the right cylinder 54, so that they can be used for removing burrs from the wheels having different outer diameters or different riser diameters. Therefore, this device may be universally employed.

The working process of the device for removing circumferential burrs of a wheel with high precision is as follows: the clamping cylinder 19 drives the left sliding plate 16 to move, the right sliding plate 17 moves synchronously under the action of the gear rack B 18, and the four clamping wheels 20 can position and clamp the inner rim of a wheel; after the wheel is positioned and clamped on a roller bed, the lower cylinders 2 drive the flange burr cutters 13 to move up to the burrs, and the servo motor I 5 is started to drive the flange burr cutters 13 to rotate so as to remove the burrs from the flange edge with high precision; when the flange burrs are removed, the electric cylinder A 24, the electric cylinder B 29 and the electric cylinder C 34 are simultaneously started to drive the sensor A 27, the sensor B 32 and the sensor C 37 respectively to contact the outside bead seat of the wheel to acquire the positions of the three contact points, the computer connects the three points into a line, center coordinates of the outside bead seat of the wheel are found according to the intersection point of perpendicular bisectors, and the center of the outside bead seat is found, that is, the centers of burrs at the outer rim and the riser are found; next, the longitudinal servo motor 42 and the transverse servo motor 44 are started according to the difference between the center coordinates of the second-step burrs and the coordinate origin to adjust the rotating centers of the rim burr cutter 51 and the riser burr cutter 55 to coincide with the rotating center of the second-step burrs; and finally, the upper cylinder 38 drives the rim burr cutter 51 and the riser burr cutter 55 to move down to the burrs, and the servo motor II 46 drives the burr cutters to rotate, so that the burrs can be removed from the outer rim and the riser with high precision.

The device can simultaneously remove circumferential burrs from the flange edge, the outer rim and the riser slot edge, which eliminates the error caused by coaxial degree deviation, so that the rotating center of the cutters coincides with the circumferential center of the burrs. The device not only realizes high-precision removal of burrs from the flange edge, but also realizes high-precision removal of burrs from the outer rim and the riser.

The invention claimed is:

1. A device for removing circumferential burrs of a wheel with high precision, comprising a frame, a plurality of lower cylinders, a plurality of lower guide posts, a lower feeding platform, a first servo motor, a shaft, a first rotating disk, a plurality of adjusting guide rails, a first gear rack, an adjusting cylinder, a left sliding table, a right sliding table, a plurality of flange burr cutters, a support plate, a plurality of clamping guide rails, a left sliding plate, a right sliding plate, a second gear rack, a clamping cylinder, a plurality of clamping wheels, a plurality of movement controlling electric cylinders, a first lifting table, a plurality of guide rails for guiding the first lifting table, a first electric cylinder, a plurality of first guide rails, a first sliding block, a first sensor, a second lifting table, a second electric cylinder, a plurality of second guide rails, a second sliding block, a second sensor, a third lifting table, a third electric cylinder, a plurality of third guide rails, a third sliding block, a third sensor, an upper cylinder, a plurality of upper guide posts, an upper feeding platform, a longitudinal fixed plate, a longitudinal servo motor, a first movable plate, a transverse servo motor, a second movable plate, a second servo motor, a second rotating disk, a left cylinder, a left guide rail, a left sliding block, a rim burr cutter, a right sliding block, a right guide rail, a right cylinder and a riser burr cutter, wherein a rotating center of the plurality of flange burr cutters is coaxial with a center of an inner rim of the wheel; the first electric cylinder is fixed on the first lifting table, an output end of the first electric cylinder is connected with the first sliding block, the first electric cylinder controls a horizontal movement of the first sliding block under the guidance of the plurality of first guide rails, the first sensor is installed on the first sliding block and is configured to acquire a first point on an outside bead seat of the wheel when the first electric cylinder drives the first sensor to contact the outside bead seat; the second electric cylinder is fixed on the second lifting table, an output end of the second electric cylinder is connected with the second sliding block, the second electric cylinder controls the horizontal movement of the second sliding block under the guidance of the plurality of second guide rails, the second sensor is installed on the second sliding block and is configured to acquire a second point on the outside bead seat when the second electric cylinder drives the second sensor to contact the outside bead seat of the wheel; the third electric cylinder is fixed on the third lifting table, an output end of the third electric cylinder is connected with the third sliding block, the third electric cylinder controls the horizontal movement of the third sliding block under the guidance of the plurality of third guide rails, the third sensor is installed on the third sliding block and is configured to acquire a third point on the outside bead seat when the third electric cylinder drives the third sensor to contact the outside bead seat of the wheel; and an included angle between the second sliding block and the third sliding block is preferably 15 degrees to 20 degrees.

2. The device for removing circumferential burrs of the wheel with high precision according to claim 1, wherein in the initial state, a rotating center of the rim burr cutter and a rotating center of the riser burr cutter coincide with the rotating center of the plurality of flange burr cutters, and the rotating center is used as a coordinate origin.

* * * * *